(12) United States Patent
Gruber (10) Patent No.: US 12,155,239 B2
(45) Date of Patent: Nov. 26, 2024

(54) HIGH POWER WIRELESS CHARGING

(71) Applicant: RENESAS DESIGN AUSTRIA GMBH, Graz (AT)

(72) Inventor: Bernhard Gruber, Graz (AT)

(73) Assignee: RENESAS DESIGN AUSTRIA GMBH, Graz (AT)

( * ) Notice: Subject to any disclaimer, the term of this patent is extended or adjusted under 35 U.S.C. 154(b) by 0 days.

(21) Appl. No.: 18/709,653

(22) PCT Filed: Nov. 4, 2022

(86) PCT No.: PCT/EP2022/080789
§ 371 (c)(1),
(2) Date: May 13, 2024

(87) PCT Pub. No.: WO2023/099109
PCT Pub. Date: Jun. 8, 2023

(65) Prior Publication Data
US 2024/0333045 A1     Oct. 3, 2024

(30) Foreign Application Priority Data

Nov. 30, 2021  (EP) ..................................  21211275

(51) Int. Cl.
| | |
|---|---|
| H02J 50/80 | (2016.01) |
| H02J 50/00 | (2016.01) |
| H02J 50/10 | (2016.01) |

(52) U.S. Cl.
CPC ........... *H02J 50/80* (2016.02); *H02J 50/005* (2020.01); *H02J 50/10* (2016.02)

(58) Field of Classification Search
CPC ..................................... H02J 50/80
USPC ......................................................... 320/108
See application file for complete search history.

(56) References Cited

U.S. PATENT DOCUMENTS

| | | | |
|---|---|---|---|
| 9,479,013 B2 | 10/2016 | Koninklijke | |
| 11,128,170 B1 | 9/2021 | Guedon | |
| 2014/0266031 A1* | 9/2014 | Sasaki .................... | H01F 38/14 320/108 |
| 2020/0373789 A1 | 11/2020 | Park et al. | |
| 2022/0271571 A1* | 8/2022 | Yang ....................... | H02J 50/12 |

OTHER PUBLICATIONS

International Search Report and Written Opinion, mailed Feb. 9, 2023 from PCT/EP2022/080789, 11 pages.

\* cited by examiner

*Primary Examiner* — Edward Tso
*Assistant Examiner* — Ahmed H Omar
(74) *Attorney, Agent, or Firm* — Workman Nydegger (57) ABSTRACT

A system including a power device and a portable device for wireless charging of a battery of the portable device, which power device includes a first transmitter stage and a second transmitter stage. The first transmitter stage includes an antenna configured to receive power adjustment information from a first receiver stage of the portable device to increase or to decrease the power transmitted by a first magnetic field emitted with the antenna of the first transmitter stage. The first receiver stage includes an antenna exposed to the first magnetic field and connected via a matching stage to a rectifier stage to rectify an antenna signal and to provide an input voltage at an input pin of a charge stage that provides a first charge current at a first output pin connected to the battery to charge the battery in charging cycles.

6 Claims, 6 Drawing Sheets

STATE OF THE ART

HIGH POWER WIRELESS CHARGING

FIELD OF THE INVENTION

The present invention relates to a system of a power device and a portable device for wireless charging of a battery of the portable device, which power device comprises a first transmitter stage with an antenna to receive power adjustment information from a first receiver stage of the portable device to increase or to decrease the power transmitted by a first magnetic field emitted with the antenna of the first transmitter stage and which first receiver stage comprises an antenna exposed to the first magnetic field and connected via a matching stage to a rectifier stage to rectify an antenna signal and to provide an input voltage ($U_I$) at an input pin of a charge stage that provides a first charge current at a first output pin connected to the battery to charge the battery in charging cycles.

BACKGROUND OF THE INVENTION

Wireless charging is used for all kind of different portable devices like a mobile phone or earphones. The portable device just has to be dropped close-by a power device that generates and emits a magnetic field via an antenna of the power device with the advantage that no wire is needed to charge the portable device. In some of these systems, the power device just emits the magnetic field and some newer systems comprise a feedback loop from the portable device to the power device to regulate the power of the magnetic field.

Figure 1:
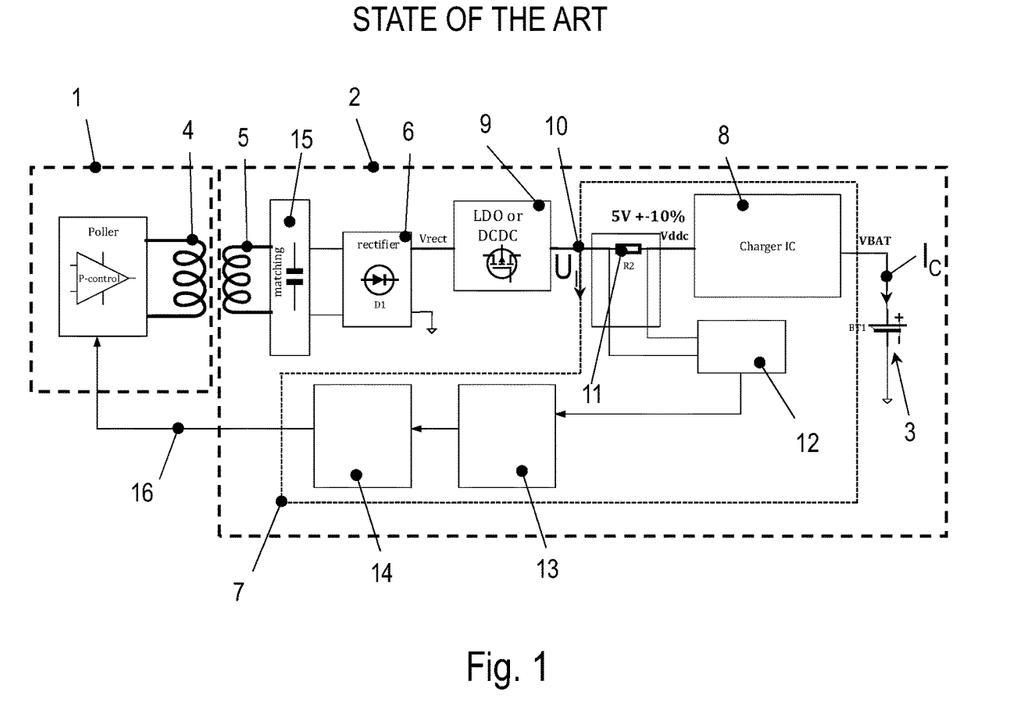
FIG. 1 shows a system known to a person skilled in the art, which system comprises a power device and a portable device with a battery to be charged wireless.

FIG. 1 shows such a system of a power device 1 and a portable device 2 with a battery 3, know to a person skilled in the art. Such a system is for instance described in the NFC Forum™ Technical Specification Version 1.0. The power device 1 called "poller" comprises an antenna 4 that emits a magnetic field with the frequency of 13.56 MHz. The portable device 2 called "listener" comprises an antenna 5 exposed to the magnetic field emitted by the power device 1. A matching circuit 15 matches the impedance of the output pins of the antenna 5 to input pins of a rectifier 6 that uses a bridge rectifier to rectify the antenna signal and to provide a direct DC voltage. A charge stage 7 of the portable device 2 is used to charge the battery 3. As the charge stage 7 comprises a charger IC 8 that needs a power voltage of 5V+/−10% and a DC/DC converter 9 is used to convert the direct DC voltage provided by rectifier 6 to an appropriate input voltage $U_I$ at an input pin 10 of charge stage 7.

Battery 3 is a Li-Ion battery that needs to be charged by charge stage 7 in different time periods with different charge currents $I_C$ and charge voltages. To achieve that, charge stage 7 comprises a serial ohmic resistance component 11 in the path between input pin 10 and battery 3 to generate a measuring voltage, which is measured by current measurement stage 12 to measure the charge current $I_C$ to charge the battery 3. Charge stage 7 furthermore comprises a digital control stage 13 that generates a power adjustment information 16 in case the input voltage $U_I$ at input pin 10 and/or the charge current $I_C$ to charge the battery 3 are too low or too high. Such power adjustment information 16 is provided by the digital control stage 13 to a Cless Communication stage 14, which complies to the NFC communication protocol to communicate the power adjustment information 16 to the power device 1. With this feedback loop from portable device 2 to power device 1, charge stage 7 can request more or less power in the magnetic field provided by the power device 1.

Figure 2:
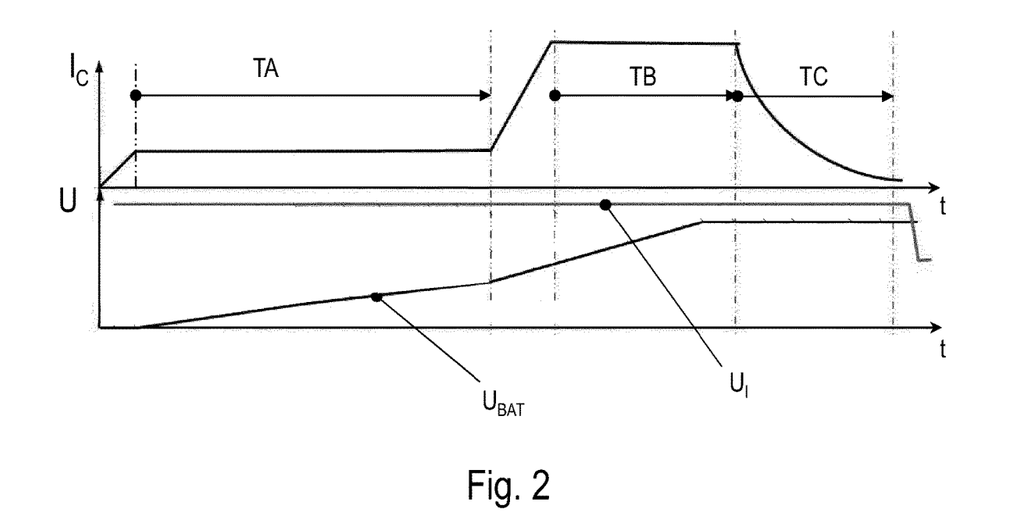
FIG. 2 shows a time diagram of the charge current to charge the battery and an input voltage of a charge stage of the portable device of the system according to FIG. 1.

FIG. 2 shows a time diagram of the charge current $I_C$ in three different time periods TA, TB and TC to load battery 3. FIG. 2 furthermore shows input voltage $U_I$ at input pin 10 of charge stage 7 and the actual battery voltage $U_{BAT}$ during the time periods TA, TB and TC to load battery 3. To actually load battery 3 only battery voltage $U_{BAT}$ multiplied with charge current $I_C$ is used. This wireless from the power device to the portable device transferred power is in the range of up to 1 W as for instance specified by the NFC-Forum specification. This amount of energy is enough to e.g. charge the battery of earphones, but will not be enough to e.g. charge a mobile phone within a reasonable time frame.

SUMMARY OF THE INVENTION

It is an object of the invention to provide a system of a power device and a portable device for wireless charging of the battery of the portable device which enables the wireless transfer of more power to enable faster charging and/or to enable to charge portable devices with larger battery capacities.

This object is achieved in a system according to claim 1.

The claimed system comprises a power device with two or more transmitter stages which each comprise their own antenna and emit their own magnetic field. The system furthermore comprises two or more receiver stages, which each comprise their own antenna to harvest power from the magnetic field of the transmitter stage to which the antenna of the receiver stage is exposed to. Such a system in principle is known from US 2014/0266031 A1, which discloses to use two transmitter stages and two receiver stages in a portable device, which receiver stages provide their induction current harvested from the antenna to a limiting controller that adjust its resistance to make the DC output voltage of both receiver stages the same. Such common output voltage is used as input for a charge module to charge the battery of the portable device. This known concept provides the disadvantage that power harvested by the antennas of the receivers is lost due to the limiting controller in each of the receiver stages. For example the antenna of the first transmitter stage might be mechanically close aligned with the antenna of the first receiver stage what results in a high induction current in the first receiver stage that is limited by limiting controller. At the same time the antenna of the second transmitter stage might be mechanically too far and bad aligned with the antenna of the second receiver stage what results in a low induction current in the second receiver stage, which is therefore not able to provide the direct DC output voltage requested at the input of the charge module. The harvested induction current might not be used at all or if used may result in a lower direct DC output voltage a requested. This know concept therefore comprises several possible operating modes where not all harvested induction current is used to load the battery. The system disclosed in US 2014/0266031 A1 furthermore does not disclose to use power adjustment information from the receiver stages to adjust the strength of the magnetic field emitted by the antennas of the transmitter stages what makes the efficiency of this know system even worse.

The inventive concept of the system claimed in claim 1 comprises a charge stage in each of the receiver stages, which each provide their part of the charge current needed to charge the battery of the portable device in the actual charging cycle. This provides the advantage that more or less all power harvested by antennas of the two or more receiver stages in the portable device is used to actually load the battery as there is no limiting controller in each receiver stage. The use of power adjustment information from the receiver stages to adjust the strength of the magnetic field emitted by the antennas of the transmitter stages makes the efficiency of this inventive system even better.

It is furthermore advantageous to realize a control unit in the power device that initializes and configures all transmitter stages of the power device and is used to process the communication with the receiver stages in the portable device via the wireless interface. Such communication is time synchronized, what means that all transmitter stages at the same first time slots exchange information, like the power adjustment information, that is relevant for the charging protocol of the charging stages in the receiver stages. In time synchronized second time slots each transmitter stage emits a magnetic field with the individual field strength that was communicated during first time slots.

In another preferred embodiment of the invention only the first transmitter stage communicates charging protocol relevant information during the first time slot with the first receiver stage. In this embodiment the field strength of all or at least of the second and all other transmitter stages (not the first transmitter stage) has been fixed during an initialization phase by the controller unit of the power device. In second time slots the second transmitter stage and all other transmitter stages (not the first transmitter stage) emit the magnetic field with the fixed field strength. In this embodiment it is possible to vary the harvested induction current by power adjustment information used to set only the variable field strength of the first transmitter stage. It would also be possible to vary the harvested induction current during second time slots by varying the duration of the second time slots which duration is synchronized by sync signals of the first transmitter stage or the control unit of the power device.

These and other aspects of the invention will be apparent from and elucidated with reference to the embodiments described hereinafter. The person skilled in the art will understand that various embodiments may be combined.

DETAILED DESCRIPTION OF EMBODIMENTS

Figure 3:
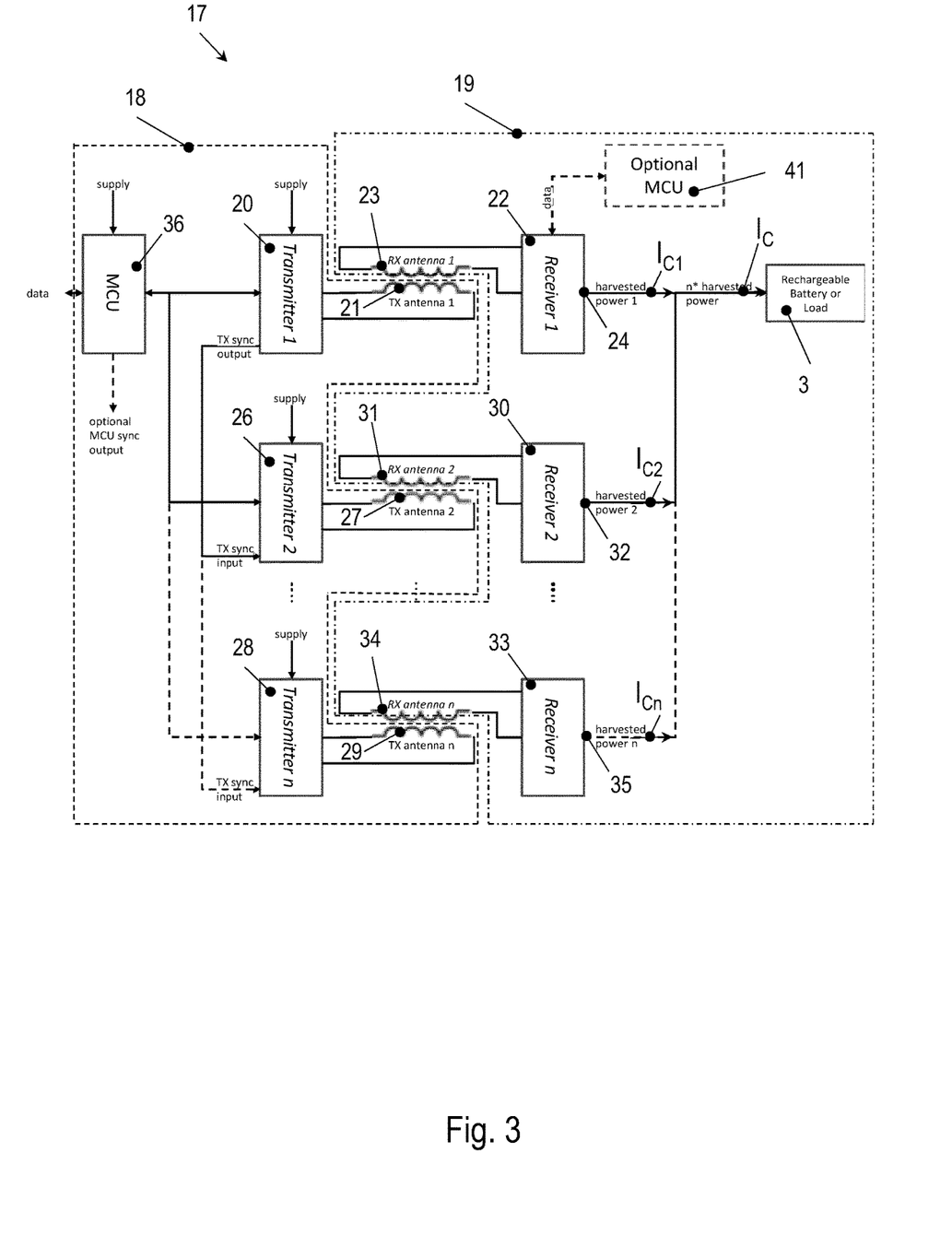
FIG. 3 shows a system according to the invention, which comprises a power device and a portable device with a battery to be charged wireless.

FIG. 3 shows a first embodiment of the invention with a system 17 of a power device 18 and a portable device 19 for wireless charging of a battery 3 of the portable device 19 according to the invention. The power device 18 is supplied by mains supply voltage and comprises a first transmitter stage 20 connected to an antenna 21 that emits a magnetic field with the frequency of 13.56 MHz. The portable device 18 comprises a first receiver stage 22 connected to an antenna 23 which is exposed to the magnetic field emitted by the antenna 21 of the first transmitter stage 20. The communication between the first transmitter stage 20 and the first receiver stage 22 in this embodiment complies with the standard ISO 18.092 known as Near Field Communication. Any other comparable standard could be used as well. In the embodiment of FIG. 3, the first receiver stage 22 comprises the same basic structure of the technical elements as disclosed in FIG. 1, as it comprises the matching circuit 15, rectifier 6, DC/DC converter 9 and charge stage 7 and provides a first charge current $I_{C1}$ at a first output pin 24 connected to the battery 3 to charge the battery 3 in the charging cycles 25 of time periods TA, TB and TC. The first receiver stage 22 with its charge stage 7 provides power adjustment information 16 during first time slots T1 to the first receiver stage 20 via the wireless interface of the antennas 21 and 23 as will be explained based on a time diagram 37 shown in FIGS. 4 and 5.

The power device 18 furthermore comprises a second transmitter stage 26 with an antenna 27 to emit a second magnetic field. In addition to that one, two or five or twenty or even fifty further transmitter stages may be realized in the power device 18. Representative for these further transmitter stages a transmitter stage 28 as nth transmitter stage is shown in FIG. 3 with an antenna 29

The portable device 19 furthermore comprises a second receiver stage 30 with an antenna 31 exposed to the second magnetic field and with a second charge stage that provides a second charge current $I_{C2}$ at a second output pin 32 connected to the battery 3 to charge the battery 3 in the charging cycles 25. In addition to that one, two or five or twenty or even fifty further receiver stages may be realized in the portable device 19. Representative for these further receiver stages a receiver stage 33 as $n^{th}$ receiver stage is shown in FIG. 3 with an antenna 34 exposed to the magnetic field of antenna 29. Receiver stage 33 provides an $n^{th}$ charge current $I_{Cn}$ at an output pin 35 connected to the battery 3 to charge the battery 3 in the charging cycles 25.

Depending on the kind of portable device 19 and the capacity and power needs of its one or more batteries 3, portable device 19 may be realized with only two, three, five or more receiver stages and antennas while the power device 18 to be used universal for different portable devices may comprise a higher number of transmitter stages and antennas to emit several magnetic fields. The charge currents $I_{Cn}$ of all output pins of receiver stages add-up to a sum charge current $I_C$ to charge the batterie 3. It is therefore advantageous to adopt the number of receiver stages of the portable device 19 to the capacity and power needs of its batteries 3.

Power device 18 furthermore comprises a control unit 36 connected to the first transmitter stage 20 and second transmitter stage 26 and any further transmitter stage 28 of the power device 18. The control unit 36 is built to initialize and configure all these transmitter stages and to detect the presence of the antennas 23, 31 and 34 of the first receiver stage 22 and the second receiver stage 30 and any further receiver stage 33 of the portable device 19 exposed to the first or second magnetic field or any further magnetic field generated by one of the transmitter stages 20, 26 or 28 of the power device 18. The initialization and configuration of the transmitter stages may include, but is not limited to: Write proper RF configuration and registers for the communication and charging protocol such as sensitivity settings, output power, charging timing. In case of a split stack architecture the initialization also includes the download of the uCode.

The control unit 36 detects the presence of the antennas 23, 31 or 34 in the magnetic fields emitted by antennas 21, 27 and 29 by analyzing the amplitude changes and/or phase changes of the antenna signal received by transmitter stages 20, 26 and 28. This amplitude changes and/or phase changes are influenced by objects like antennas in the magnetic fields emitted by antennas 21, 27 and 29. As a result, control unit 36 knows which of the transmitter stages 20, 26 and/or 28 may be used for wireless power transfer to receivers 22, 30 and/or 33 to load the battery 3. Those transmitter stages for which no antenna of a receiver stage was detected in their magnetic field by control unit 36 during an initialization phase TI are switched-off for first time slots T1 and second time slots T2. In other embodiments of the invention such a detection of receiver stages with antennas in the magnetic field of antennas of transmitter stages may be processed from time to time during the time to load battery 3 after first time slots T1 or second time slots T2.

Figure 4:
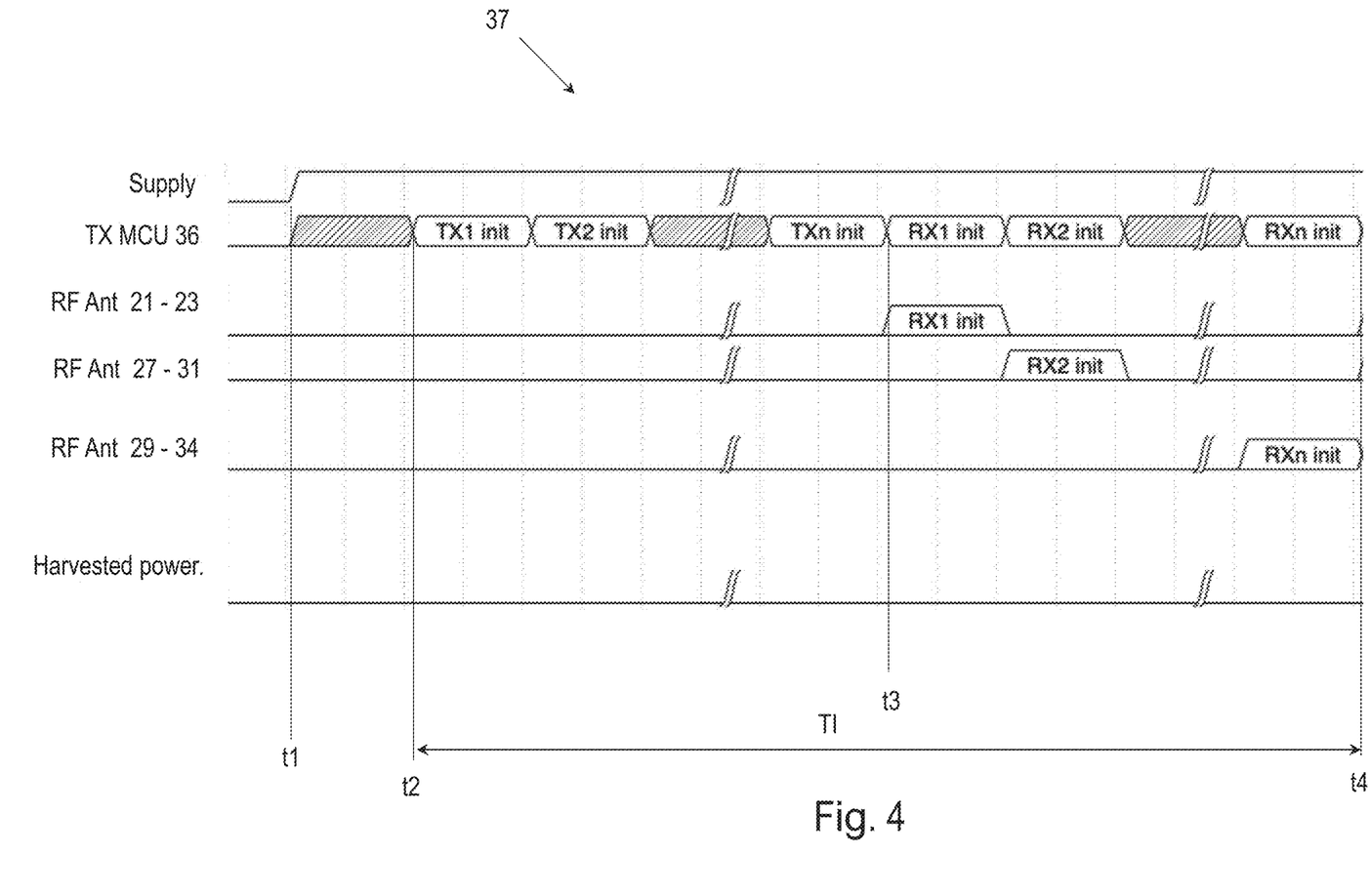
FIGS. 4 and 5 show a time diagram of relevant signals and data communicated by the system according to FIG. 3.
Figure 5:
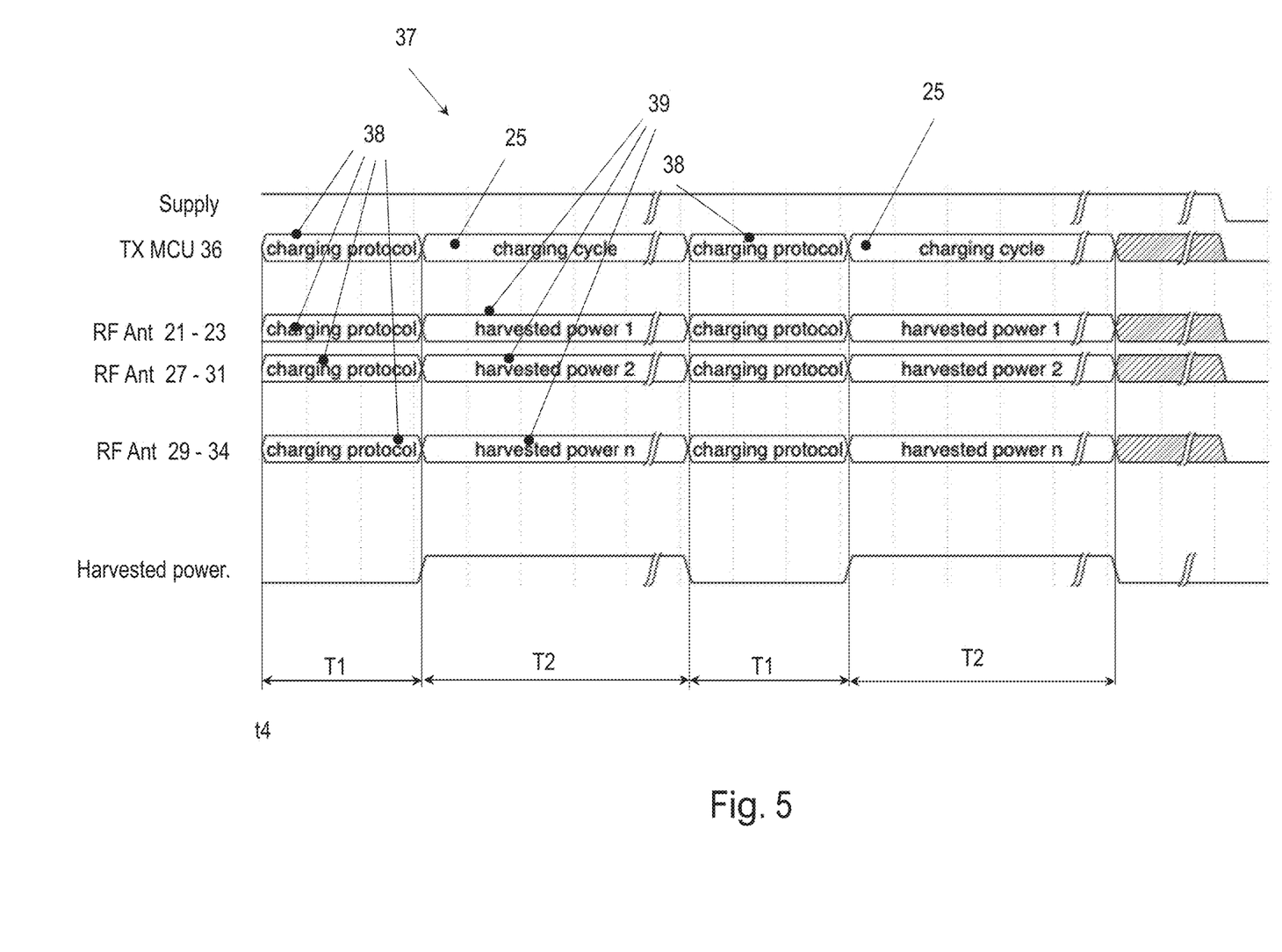

The technical functionality of system 17 of FIG. 3 will be explained based on the time diagram 37 shown in FIGS. 4 and 5. FIGS. 4 and 5 from top to bottom show the following signals over time. Supply voltage of e.g. DC 5V at all transmitter stages 20, 26 and 28 and the controller unit 36 of the power device 18; transmission data TX MCU 36 from controller unit 36 to transmitter stages 20, 26 and 28 and via the wireless interface to receiver stages 22, 30 and 33; data RF Ant 21-23 transmitted over the first magnetic field of antennas 21 and 23; data RF Ant 27-31 transmitted over the second magnetic field of antennas 27 and 31; data RF Ant 29-34 transmitted over the magnetic field of antennas 29 and 34; sum of harvested power on output pins 24, 32 and 35. At a time instance t1 the supply voltage for power device 18 is switched on and at time instance t2 controller unit 36 initializes and configures the first transmitter stage 20, then the second transmitter stage 26 until the $n^{th}$ transmitter stage 28 is initialized and configured at a time instance t3. After that controller unit 36 via transmitter stages 20, 26 and 28 initializes the communication between all transmitter stages 20, 26 and 28 of the power device 18 with all detected receiver stages 22, 30 and 33 of the portable device 19 that are exposed to the same magnetic field during an initialization phase TI until time instance t4.

From time instance t4 onwards control unit 36 is built to process all initialized communications between transmitter stages 20, 26 and 28 and receiver stages 22, 30 and 33 as time synchronized parallel communications. Time synchronized means that the first time slot T1 to exchange charging protocol information 38 including individual power adjustment information 16 for each of the emitted magnetic fields has the same duration for all transmitter stages of power device 18 and for all receiver stages of portable device 19. This power adjustment information 16 transferred from each receiver stage to the coupled transmitter stage sets the individual strength of the magnetic field provided by this transmitter stage during the next charging cycle 25 in the next second time slot T2. During this second time slot T2 transmitter stages 20, 26 and 28 provide magnetic fields with their individual signal strength at their antennas 21, 27 and 29 while receiver stages 22, 30 and 33 harvest power 39 with their antennas 23, 31 and 34. At the end of this charging cycle 25, receiver stages 22, 30 and 33 measure the actual battery voltage $U_{BAT}$ of battery 3 and based on that transmit power adjustment information 16 as part of the charging protocol information 38 in the next first time slot T1. This process of alternating first time slots T1, with the exchange of charging protocol information 38, and second time slots T1 with charging cycles 25 is repeated until the battery 3 is fully loaded.

Figure 6:
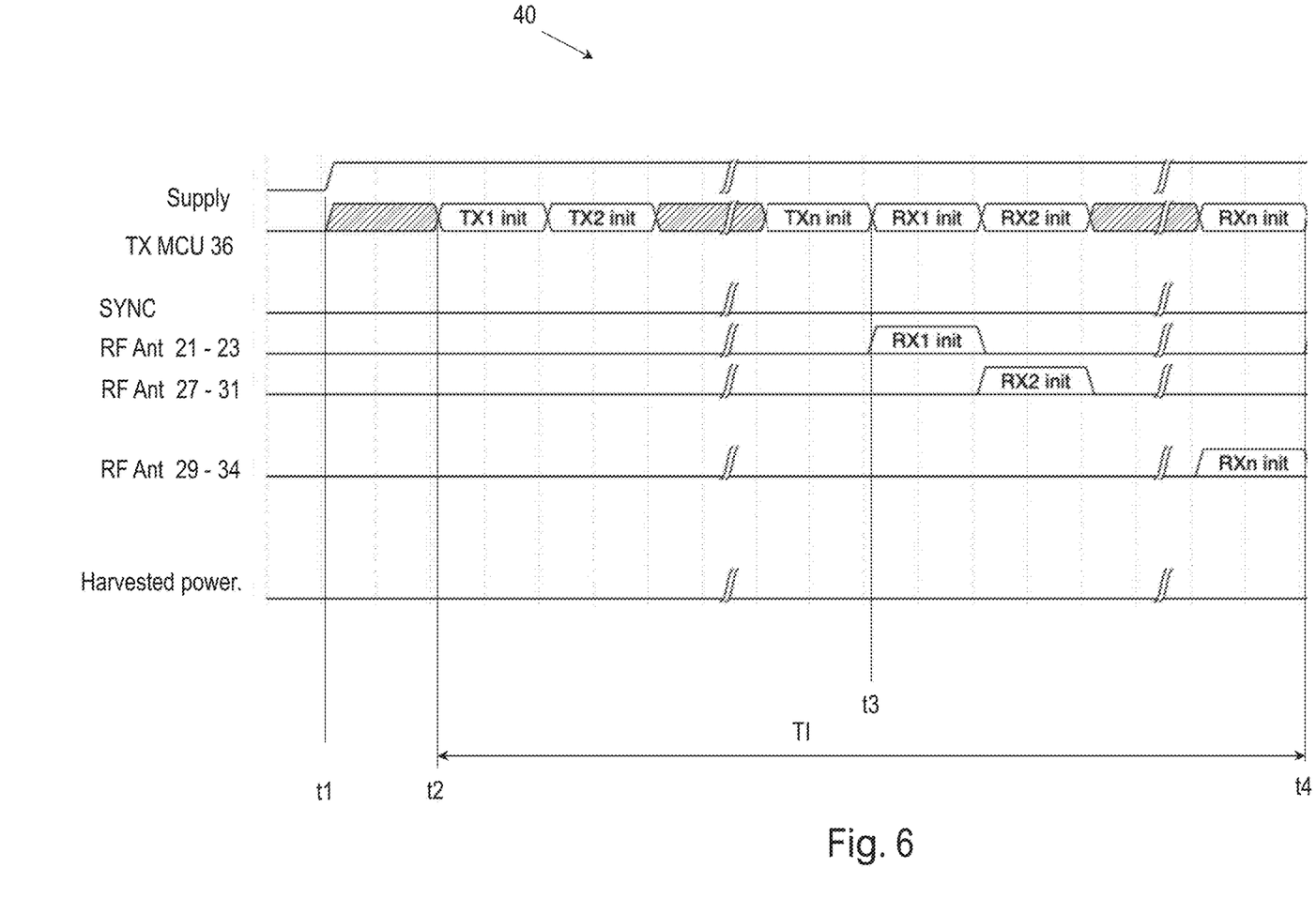
FIGS. 6 and 7 show a further time diagram of relevant signals and data communicated by another system similar to that disclosed in FIG. 3.
Figure 7:
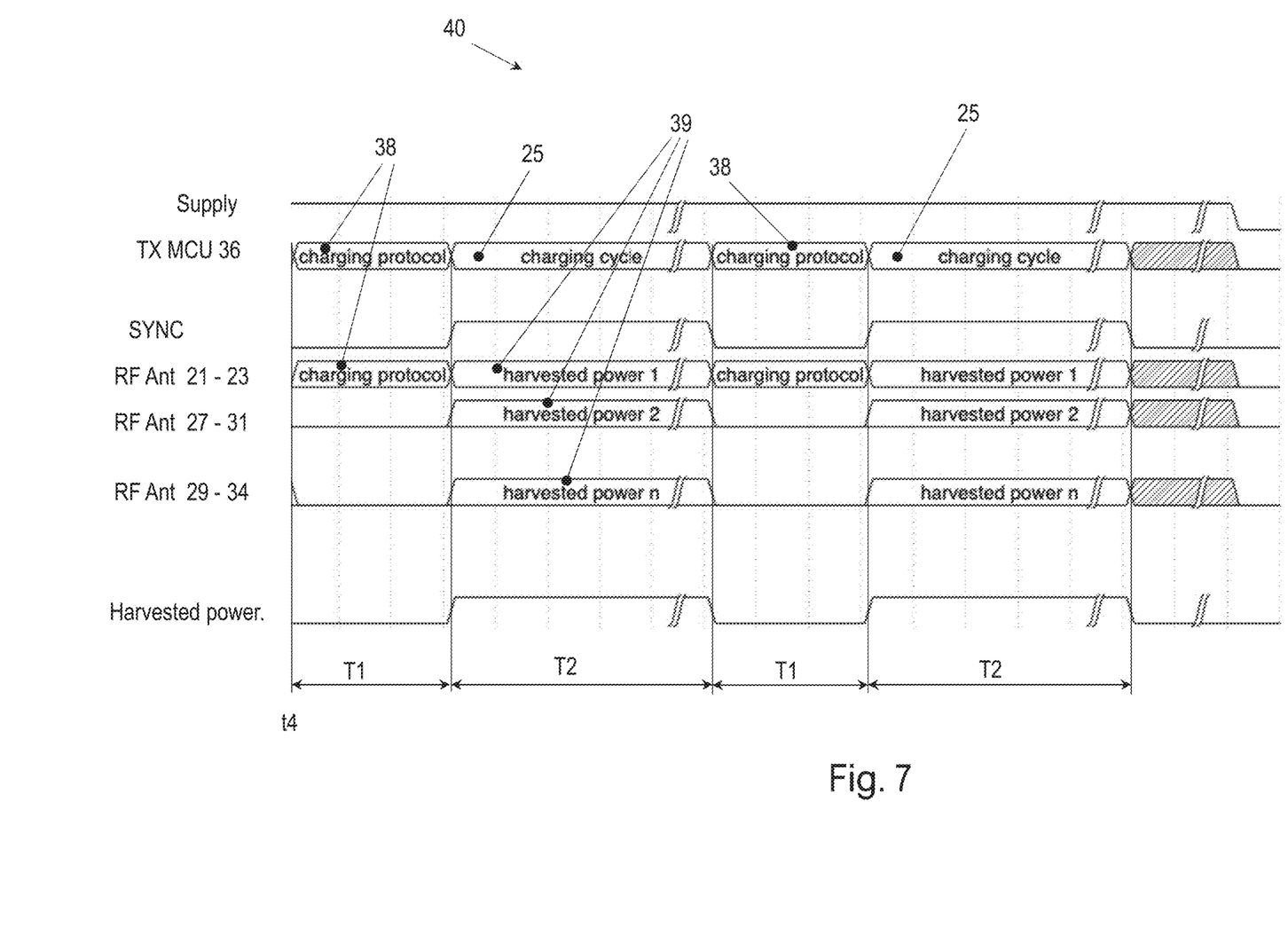

In another embodiment of the invention the technical functionality of system 17 of FIG. 3 with a different charging protocol will be explained based on the time diagram 40 shown in FIGS. 6 and 7. The initialization phase TI until time instance t4 shown in FIG. 6 is the same as the initialization phase TI until time instance t4 shown in FIG. 4. Time diagram 40 comprises an additional sync signal SYNC that is generated by the first transmitter stage 20 and provided to the second transmitter stage 26 and any further transmitter stage 28 of the power device 18 to synchronize the begin and end of first time slots T1 and second time slots T2. This synchronization is needed as in this embodiment only the first transmitter stage 20 communicates with the first receiver stage 22 to exchange charging protocol information 38. As explained above for the previous embodiment, at the end of charging cycles 25 all receiver stages 22, 30 and 33 measured the actual battery voltage $U_{BAT}$ of battery 3 and based on that transmitted power adjustment information 16 as part of the charging protocol information 38 in the next first time slot T1. This in fact is not needed as all receiver stages 22, 30 and 33 will measure the same actual battery voltage $U_{BAT}$ of battery 3 and therefore transmit the same power adjustment information 16. Therefore, in this embodiment of the invention, only the first transmitter stage 20 communicates with the first receiver stage 22 to exchange charging protocol information 38 and the other transmitter stages 26 and 28 are time synchronized with the sync signal SYNC. This comprises the advantage that less information needs to be generated and transmitted and analyzed within power device 18 and portable device 19. Based on the exchanged charging protocol information 38 and the sync signal SYNC the time duration T2 of the charging cycle 25 could be variated while using a fixed strength of all magnetic fields during charging cycles 25 to transfer and harvest more or less power depending on the power needs of the portable device 19 during the difference charging periods TA, TB and TC. In another variation of this embodiment the field strength for all magnetic fields of the transmitter stages 20, 26 and 28 could be adopted for each charging cycle 25 based on the exchanged power adjustment information 16 between the first transmitter stage 20 and the first receiver stage 22 with a fixed time duration T2 of the charging cycle 25.

In a further embodiment of the invention not the first transmitter stage 20, but the controller unit 36 could generate the sync signal SYNC to synchronize the transmitter stages 20, 26 and 28. The same advantage is achieved that less information needs to be generated and transmitted and analyzed within power device 18 and portable device 19.

In a further embodiment of the invention portable device 19 comprises a controller unit 41 to configure the first receiver stage 22 and/or any further receiver stage 30 or 33 of the portable device 19 to enable further data communication from the first receiver stage 22 and/or any further receiver stage 30 or 33 of the portable device 19 to the controller unit 36 of the power device 18. With this further data communication general data could be exchanged like type or age of the battery or any further data within portable device 19 that is of interest for power device 18.

In another preferred embodiment of the invention the receiver stages of the portable device could be realized with a different charge stage than that disclosed in FIG. 1. In this preferred embodiment a charge stage disclosed in a co-pending patent European patent application EP 21155156.9 could be used, which comprises a measuring stage to measure the actual voltage of the battery. This charge stage furthermore comprises a charge voltage control stage, that is built to generate the power adjustment information for the power device to increase or to decrease the power of the magnetic field to steer the input voltage of the charge stage to essentially follow the actual voltage of the battery. This enables a substantial reduction of the loss power $P_{LOSS}$ which is the area below voltage $U_I$ at input pin 10 of charge stage 7 and the actual battery voltage $U_{BAT}$ during the time periods TA, TB and TC in FIG. 2. This reduction of loss power $P_{LOSS}$ is possible as only as much power as needed to actually charge the battery is requested from and delivered by the power device in the magnetic field. As the measurement of the charge current is realized by a transistor in the path between the input pin and the output pin of charge stage a separate serial ohmic resistance component as shown in FIG. 2 can be omitted what further decreases loss power in the portable device.

The invention claimed is:

1. A system of a power device and a portable device for wireless charging of a battery of the portable device, which power device comprises a first transmitter stage with an antenna configured to receive power adjustment information from a first receiver stage of the portable device that is configured to increase or to decrease the power transmitted by a first magnetic field emitted with the antenna of the first transmitter stage and which first receiver stage comprises an antenna exposed to the first magnetic field and connected via a matching stage to a rectifier stage and configured to rectify an antenna signal and to provide an input voltage at an input pin of a charge stage that provides a first charge current at a first output pin connected to the battery to charge the battery in charging cycles, and the power device further comprises a second transmitter stage with an antenna configured to emit a second magnetic field and the portable device comprises a second receiver stage with an antenna exposed to the second magnetic field and with a second charge stage that provides a second charge current at a second output pin connected to the battery to charge the battery in the charging cycles, wherein the first receiver stage is configured to measure an actual battery voltage of the battery of the portable device and based on that transmit the power adjustment information in for all transmitter stages and receiver stages time synchronized first time slots alternating with charging cycles in second time slots repeated until the battery is fully loaded.

2. The system according to claim 1, wherein the power device comprises a control unit connected to the first and second transmitter stage and any further transmitter stage of the power device and is configured to initialize and configure all these transmitter stages and to detect the presence of the antennas of the first and second receiver stage and any further receiver stage of the portable device exposed to the first or second magnetic field or any further magnetic field generated by one of the transmitter stages of the power device.

3. The system according to claim 2, wherein the control unit is configured to initialize the communication between all transmitter stages of the power device and all detected receiver stages of the portable device that are exposed to the same magnetic field during an initialization phase.

4. The system according to claim 3, wherein the control unit is configured to process all initialized communications between transmitter stages and receiver stages as time synchronized parallel communications with alternately exchange of individual power adjustment information for each of the emitted magnetic fields in first time slots and with power transfer via the emitted magnetic fields with individual strength of the magnetic fields during charging cycles in second time slot.

5. The system according to claim 2, wherein the control unit is configured to process communication only between the first transmitter stage and the first receiver stage to exchange power adjustment information in first time slots with alternately time synchronized parallel power transfer via emitted magnetic fields of all transmitter stages with all detected receiver stages in second time slots with a sync signal (SYNC) generated by the first transmitter stage or the control unit to synchronize second time slots.

6. The system according to claim 1, wherein the portable device comprises a controller unit operable to configure the first receiver stage and/or any further receiver stage of the portable device the enable further data communication from the first receiver stage and/or any further receiver stage of the portable device to the controller unit of the power device.

* * * * *